United States Patent [19]
Kijima et al.

[11] Patent Number: 5,989,640
[45] Date of Patent: Nov. 23, 1999

[54] PROPELLANT-FREE LUSTERING AND PROTECTING AGENT FOR RUBBER, VINYL, AND THE LIKE

[75] Inventors: Tetsuo Kijima, Machida, Japan; Nobuhiro Yoshikawa, Aliso Viejo; Toshiji Tanaka, Irvine, both of Calif.

[73] Assignee: No Touch North America, Lake Forest, Calif.

[21] Appl. No.: 08/933,894

[22] Filed: Sep. 19, 1997

Related U.S. Application Data

[63] Continuation-in-part of application No. 08/734,719, Oct. 21, 1996, Pat. No. 5,844,007.

[51] Int. Cl.⁶ ............................................. B05D 3/02
[52] U.S. Cl. ..................... 427/387; 528/10; 528/33; 528/36; 528/37; 528/42
[58] Field of Search ................... 528/10, 37, 33, 528/36, 42

[56] References Cited

U.S. PATENT DOCUMENTS

| | | | |
|---|---|---|---|
| 2,739,952 | 3/1956 | Linville | 528/37 |
| 3,175,995 | 3/1965 | Elliott et al. | 528/37 |
| 3,575,910 | 4/1971 | Thomas | 260/29.6 |
| 3,929,492 | 12/1975 | Chapman et al. | 106/3 |
| 3,956,174 | 5/1976 | Palcher | 252/400 R |
| 4,133,921 | 1/1979 | Palcher | 427/355 |
| 4,423,095 | 12/1983 | Blizzard | 427/387 |
| 4,537,677 | 8/1985 | Keil | 208/370 |
| 4,584,324 | 4/1986 | Bauman et al. | 521/88 |
| 4,704,422 | 11/1987 | Bakken | 524/375 |
| 4,761,312 | 8/1988 | Koshi et al. | 427/387 |
| 4,788,001 | 11/1988 | Narula | 252/312 |
| 4,824,890 | 4/1989 | Glover et al. | 524/253 |
| 4,874,547 | 10/1989 | Narula | 252/312 |
| 4,880,557 | 11/1989 | Ohara et al. | 252/174.15 |
| 4,950,502 | 8/1990 | Saam et al. | 427/213.36 |
| 4,952,550 | 8/1990 | Wallach et al. | 502/404 |
| 4,954,554 | 9/1990 | Bunge | 528/388 |
| 4,959,341 | 9/1990 | Wallach | 502/404 |
| 5,001,183 | 3/1991 | Sands et al. | 524/493 |
| 5,844,007 | 12/1998 | Kijima et al. | 525/477 |

FOREIGN PATENT DOCUMENTS

| | | |
|---|---|---|
| 986255 | 3/1976 | Canada . |
| 1039142 | 9/1978 | Canada . |
| 1200219 | 12/1959 | France . |
| 2161068 | 6/1973 | France . |
| 2264086 | 1/1975 | France . |
| 2258365 | 11/1972 | Germany . |
| 2509508 | 9/1975 | Germany . |
| 2265378 | 8/1982 | Germany . |
| 50-157403 | 12/1975 | Japan . |
| 7215873 | 5/1973 | Netherlands . |
| 7502809 | 9/1975 | Netherlands . |
| 1366593 | 11/1972 | United Kingdom . |
| 1492939 | 11/1977 | United Kingdom . |

*Primary Examiner*—Melvyn I. Marquis
*Attorney, Agent, or Firm*—Stetina Brunda Garred & Brucker

[57] ABSTRACT

A propellant-free composition for lustering and protecting a surface such as a rubber sidewall of a vehicle tire or a vinyl or similar surface. The composition has (1) from about 10 wt. % to 100 wt. % of a high molecular weight liquid linear polysiloxane having a molecular weight above about 550, and (2) from 0 wt. % to about 90 wt. % of a low molecular weight liquid linear and/or cyclic polysiloxane having a molecular weight below about 550. Surface activity of the silicone component of the composition is such that the high molecular weight polysiloxane functions to produce a high luster, while the low molecular weight polysiloxane functions as an evaporative carrier-solvent diluent medium for delivery of the silicone component to the surface and to produce an even distribution on that surface.

9 Claims, No Drawings

PROPELLANT-FREE LUSTERING AND PROTECTING AGENT FOR RUBBER, VINYL, AND THE LIKE

CROSS-REFERENCE TO RELATED APPLICATION

This application is a continuation-in-part of United States Patent application Ser. No. 08/734,719, filed Oct. 21, 1996, now U.S. Pat. No. 5,844,007.

FIELD OF THE INVENTION

The present invention relates in general to care of rubber, vinyl, and similar surfaces, and in particular to a composition including high molecular weight linear polysiloxane preferably along with low molecular weight linear and/or cyclic siloxane to be applied to a surface such as a rubber sidewall of a vehicle tire or to a vinyl or similar surface for lustering and protecting the surface.

BACKGROUND OF THE INVENTION

Care, protection and physical appearance of certain rubber, vinyl and similar surfaces is important both to the value and longevity of the products bearing those surfaces. Of particular importance is the care, protection and appearance of vehicle components such as dashboards, door liners, and especially tires. Tires in particular must function under relatively hostile environmental conditions which can include extreme heat, extreme cold, degrading pollutant exposure including ozone, hazardous road conditions, and the like. Because of these ambient conditions, vehicle owners who take pride in the overall appearance of their vehicles must regularly attend to maintenance of that appearance.

Present vehicle care products available for lustering and protecting rubber, vinyl, and similar surfaces generally are compositions of a silicon-emulsion and silicon-oil blend in combination with a petroleum distillate solvent and chloride or fluoride carrier for application to the surface to be protected. While surface appearance immediately after application of prior art compositions is usually acceptable, appearance quality can diminish relatively quickly and leave blotches, streaks and an otherwise dull surface.

In view of the behavior of the above-discussed vehicle care products, it is apparent that a need is present for a lustering and protecting composition for rubber, vinyl, and similar surfaces where both appearance and protection is retained for a longer period of time. Accordingly, a primary object of the present invention is to provide a composition for lustering and protecting a surface such as a sidewall of a vehicle tire wherein the components of the composition include a high molecular weight polysiloxane and preferably a low molecular weight linear and/or cyclic polysiloxane to thereby achieve greater longevity and uniformity on a surface upon which the composition is applied.

Another object of the present invention is to provide a composition for lustering and protecting a rubber, vinyl or similar surface wherein the composition contains no petroleum distillate solvent.

These and other objects of the invention will become apparent throughout the description which now follows.

SUMMARY OF THE INVENTION

The present invention is a propellant-free composition for lustering and protecting a surface such as a rubber sidewall of a vehicle tire or a vinyl or similar surface. The composition comprises:

(a) from about 10 wt. % to 100 wt. % of a high molecular weight liquid polysiloxane having a molecular weight above about 550 and of the formula $(CH_3)_2R_1SiO-(Si(CH_3)_2O)_m-(SiRCH_3)_2O)_n-SiR_3(CH_3)_2O)_n-SiR_3(CH_3)$ wherein R1, R2 and R3 are selected from the group consisting of hydroxy, alkanol, amino, fluorocarbon, carboxy, epoxy, phenyl, alkylene oxide, alkyl, and mixtures thereof, and wherein l=6–10,000, m=0–1,000, and n=6–10,000; and (b) from 0 wt. % to about 90 wt. % of a low molecular weight liquid polysiloxane having a molecular weight below about 550, the low molecular weight polysiloxane selected from the group consisting of a linear polysiloxane, a cyclic polysiloxane, and a mixture thereof, wherein the linear polysiloxane is defined by the formula $(CH_3)_3SiO-((CH_3)_2SiO)_n-Si(CH_3)_3$ where n=0–5, and wherein the cyclic polysiloxane is defined by the formula $-((CH_3)_2SiO)_n-$ where n=3–6.

Surface lustering and protection is accomplished by the high molecular weight formulation, while the low molecular weight formulation functions as a carrier-solvent diluent. Preferably, the composition contains between about 30 wt. % to about 70 wt. % of each of the high and low molecular weight formulations. The lustering and protecting formulation of the composition has a molecular weight above about 550, and a preferred viscosity greater than about seven cp at 25° C., and preferably from about 100 to about 10,000 cp. Conversely, the low molecular weight formulation of the composition has a molecular weight below about 550 and a viscosity less than about seven cp. The present invention includes methodology for lustering and protecting a surface by applying the above-defined composition in an amount sufficient to luster and protect that surface.

Surface activity of the formulations of the polysiloxane component is such that the high molecular weight polysiloxane functions to produce a high luster, while the low molecular weight polysiloxane functions as an evaporative medium for delivery of the polysiloxane component to the surface and to produce an even distribution on that surface. While prior art compositions include petroleum solvents that evaporate relatively quickly, the composition of the present invention contains no such hydrocarbon solvent, but rather incorporates the low molecular weight polysiloxane, both linear and cyclic, which evaporates relatively slowly. By so doing, a mixture of high and low molecular weight polysiloxanes is allowed to actively associate with the treated surface for a longer period of time. This association promotes uniformity and longevity of mixture application, resulting in improved longevity of luster, luster uniformity, and protection from the environment.

DETAILED DESCRIPTION OF THE PREFERRED EMBODIMENT

The present invention provides a composition and methodology to accomplish lustering and protection for a rubber, vinyl, plastic, or similar surface. Accordingly, rubber of a sidewall of a vehicle tire provided the rubber surface for Examples 1–6, described below. The rubber was provided as mounted strips 125 mm long and 12 mm wide, with a thickness of 2 mm.

Example 1

A liquid composition was prepared containing 60.0 wt. % dimethylsiloxane having a viscosity of 100 cp, and 40.0 wt. % octamethyl cyclotetrasiloxane (molecular weight 296.62). The composition was placed in a pump applicator container, and a quantity of the composition sufficient to cover the described rubber surface was sprayed thereon and not wiped. The surface was analyzed as described below.

Example 2

A liquid composition was prepared containing 60.0 wt. % functional silicone oil end-blocked with silanol having a viscosity of 100 cp, and 40.0 wt. % octamethyl cyclotetrasiloxane (molecular weight 296.62), and placed in a pump applicator container. A quantity of the composition sufficient to cover the described rubber surface was sprayed thereon and not wiped, and the surface was analyzed as described below.

Example 3

A liquid composition containing 100 wt. % dimethyl silicone oil having a viscosity of 1,000 cp was placed in a pump applicator container. A quantity of the composition sufficient to cover the described rubber surface was sprayed thereon and not wiped, and the surface was analyzed as described below.

Example 4

A liquid composition was prepared containing 80.0 wt. % dimethyl silicone oil having a viscosity of 100 cp, and 20.0 wt. % dimethyl silicone oil having a viscosity of 10,000 cp. The resulting liquid composition was placed in a pump applicator container, and a quantity of the composition sufficient to cover the described rubber surface was sprayed thereon and not wiped. The surface was analyzed as described below.

Example 5

A liquid composition was prepared containing 35.0 wt. % dimethyl silicone oil having a viscosity of 100 cp, 5.0 wt. % dimethyl silicone oil having a viscosity of 10,000 cp, and 60.0 wt. % octamethyl trisiloxane (molecular weight 236.60). The resulting liquid composition was placed in a pump applicator container, and a quantity of the composition sufficient to cover the described rubber surface was sprayed thereon and not wiped. The surface was analyzed as described below.

Example 6

A liquid composition was prepared containing 30.0 wt. % dimethyl silicone oil having a viscosity of 100 cp, 30.0 wt. % amino functional silicone oil having a viscosity of 100 cp, and 40.0 wt. % octamethyl cyclotetrasiloxane (molecular weight 296.62). The resulting composition was placed in a pump applicator container, and a quantity of the composition sufficient to cover the described rubber surface was sprayed thereon and not wiped. The surface was analyzed as described below.

Analysis of Examples

Analytical results through observation revealed that the respective exemplified compositions were uniformly distributed on the respective rubber surfaces, and that the low molecular weight polysiloxanes evaporated over a period of five to ten minutes. Long term observation of the rubber confirmed that all of the surfaces developed favorable lusters without any streaking or blotching, and maintained favorable appearances with no adverse effects to the rubber. The composition of Example 4 provided the highest shine, but also was the most greasy of the compositions. The composition of Example 6 was the second most greasy and had a lesser shine than that of Example 4. The composition of Example 5 was the most preferred with respect to a favorable blotch-free, streak-free luster.

In addition to observational analysis of surface finish-appearance, comparative tests were performed to determine the effect of ozone on treated rubber. In particular, rubber strips as defined above were placed in an ozone chamber containing 200 pphm (parts per hundred million) ozone at 40° C. for two hours. The strips were subjected to elongation to 125% the original length and return to original length 30 times per minute. In addition to treating respective strips with the compositions of Examples 1–6, competitive products were applied to respective strips for like analysis of ozone effects. With respect to a comparable test of products in connection with product damage due to ozone, and reported according to a subjective scale of "excellent," "good," "fair," and "poor," products of the above Examples were rated "excellent" with respect to cracking and blistering, while competing products were rated as "good," "fair," and "poor" in measuring the same parameters.

As is apparent from the results of the above Examples, compositions of the present invention not only provide aesthetic enhancement of appearances, but also address protection of structural integrity in untoward environmental conditions as represented by an ozone atmosphere. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A propellant-free composition for lustering and protecting a rubber, vinyl, or a similarly pregnable lusterable composition comprising:

(a) from about 10 wt. % to 100 wt. % of a high molecular weight liquid polysiloxane having a molecular weight above about 550 and of the formula $$(CH_3)_2R_1SiO-(Si(CH_3)_2O)_L-(SiR_2CH_3O)_m-(Si(CH_3)_2O)_n-SiR_3(CH_3)_2$$

wherein $R_1$ $R_2$ and $R_3$ are selected from the group consisting of hydroxy, alkanol, amino, fluorocarbon, COOH, epoxy, phenyl, alkylene oxide, alkyl, and mixtures thereof, and wherein 1=6–10,000, m=0–1,000, and n=6–10,000; and (b) from 0 wt. % to about 90 wt. % of a low molecular weight liquid polysiloxane having a molecular weight below about 550, the low molecular weight polysiloxane selected from the group consisting of a linear polysiloxane, a cyclic polysiloxane, and a mixture thereof, wherein the linear polysiloxane is defined by the formula $$(CH_3)_3SiO-((CH_3)_2SiO)_n-Si(CH_3)_3$$

where n=0–5, and wherein the cyclic polysiloxane is defined by the formula $$-((CH_3)_2SiO)_n-$$

where n=3–6.

2. A propellant-free composition as claimed in claim 1 having from about 30 wt. % to about 70 wt. % of the high molecular weight polysiloxane and from about 70 wt. % to about 30 wt. % of the low molecular weight polysiloxane.

3. A propellant-free composition as claimed in claim 2 having from about 30 wt. % to about 70 wt. % of the low molecular weight polysiloxane.

4. A propellant-free composition as claimed in claim 1 wherein the low molecular weight polysiloxane is selected from the group consisting of octamethyl cyclotetrasiloxane and octamethyl trisiloxane.

5. A propellant-free composition as claimed in claim 1 having from about 30 wt. % to about 70 wt. % of the low molecular weight polysiloxane.

6. A method for lustering and protecting a rubber, vinyl, or similarly pregnable lusterable surface, the method comprising:
   a) providing a rubber, vinyl or similarly pregnable lusterable surface;
   b) providing a propellant-free composition comprising:
      (i) from about 10 wt. % to 100 wt. % of a high molecular weight liquid polysiloxane having a molecular weight above about 550 and of the formula

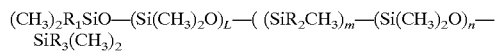
      (CH$_3$)$_2$R$_1$SiO—(Si(CH$_3$)$_2$O)$_L$—( (SiR$_2$CH$_3$)$_m$—(Si(CH$_3$)$_2$O)$_n$—SiR$_3$(CH$_3$)$_2$ wherein R$_1$, R$_2$ and R$_3$ are selected from the group consisting of hydroxy, alkanol, amino, fluorocarbon, COOH, epoxy, phenyl, alkylene oxide, alkyl, and mixtures thereof, and wherein l=6–10,000, m=0–1,000, and n=6–10,000; and (ii) from 0 wt. % to about 90 wt. % of a low molecular weight liquid polysiloxane having a molecular weight below about 550, the low molecular weight polysiloxane selected from the group consisting of a linear polysiloxane, a cyclic polysiloxane, and a mixture thereof, wherein the linear polysiloxane is defined by the formula

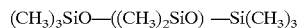
      (CH$_3$)$_3$SiO—((CH$_3$)$_2$SiO) —Si(CH$_3$)$_3$ where n=0–5, and wherein the cyclic polysiloxane is defined by the formula

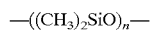
      —((CH$_3$)$_2$SiO)$_n$— where n=3–6; and
   (c) applying the composition on the surface in an amount sufficient to luster and protect the surface.

7. A method as claimed in claim 6 wherein the composition has from about 30 wt. % to about 70 wt. % of the high molecular weight polysiloxane and from about 70 wt. % to about 30 wt. % of the low molecular weight polysiloxane.

8. A method as claimed in claim 7 wherein the composition has from about 30 wt. % to about 70 wt. % of the low molecular weight polysiloxane.

9. A method as claimed in claim 6 wherein in the composition the low molecular weight polysiloxane is selected from the group consisting of octamethyl cyclotetrasiloxane and octamethyl trisiloxane.

* * * * *